(12) United States Patent  
Qian et al.

(10) Patent No.: US 12,252,088 B2
(45) Date of Patent: Mar. 18, 2025

(54) VEHICLE OCCUPANT RESTRAINT SYSTEM

(71) Applicant: DALPHI METAL ESPANA S.A., Vigo (ES)

(72) Inventors: Chaochao Qian, Shanghai (CN); Emiliano Core Almarza, Laguna de Duero (ES); Andrés Casanova Mateo, Valladolid (ES); Adrían Gutiérrez Garcia, Valladolid (ES); Ramon Mirones Gomez, Valladolid (ES); Antonio Navarro Arranz, Valladolid (ES); Alfonso Bustos Garcia, Valladolid (ES)

(73) Assignee: DALPHI METAL ESPANA, S.A., Vigo (ES)

( * ) Notice: Subject to any disclaimer, the term of this patent is extended or adjusted under 35 U.S.C. 154(b) by 0 days.

(21) Appl. No.: 18/256,464

(22) PCT Filed: Dec. 8, 2021

(86) PCT No.: PCT/EP2021/084736
§ 371 (c)(1),
(2) Date: Jun. 8, 2023

(87) PCT Pub. No.: WO2022/122801
PCT Pub. Date: Jun. 16, 2022

(65) Prior Publication Data
US 2024/0025364 A1    Jan. 25, 2024

(30) Foreign Application Priority Data
Dec. 10, 2020   (DE) .................. 102020132998.9

(51) Int. Cl.
B60R 21/214    (2011.01)
B60R 21/015    (2006.01)
(Continued)

(52) U.S. Cl.
CPC ...... B60R 21/01552 (2014.10); B60R 21/214 (2013.01); B60R 21/2171 (2013.01);
(Continued)

(58) Field of Classification Search
CPC ............ B60R 21/01552; B60R 21/214; B60R 21/2338; B60R 21/213; B60R 2021/23382
See application file for complete search history.

(56) References Cited

U.S. PATENT DOCUMENTS

2012/0098242 A1* 4/2012 Aranzulla ............. B60R 21/231
                                                                280/743.1
2014/0232092 A1* 8/2014 Le Norcy ............. B60R 21/231
                                                                112/475.08
(Continued)

FOREIGN PATENT DOCUMENTS

DE       10020353 A1    4/2000
DE   102008057968 A1    5/2010
(Continued)

OTHER PUBLICATIONS

Eyrainer et al., Vehicle occupant restraint device, Mar. 22, 2001, EPO, DE 100 20 353 A1, Machine Translation of Description (Year: 2001).*

(Continued)

Primary Examiner — James A English
(74) Attorney, Agent, or Firm — Tarolli, Sundheim, Covell & Tummino LLP

(57) ABSTRACT

A vehicle occupant restraint system includes an airbag module (18) that is disposed in a roof area (16) of a vehicle and is assigned to a front seat (14). The airbag module (18) comprises an airbag (20) that is disposed so that it deploys in the vehicle longitudinal direction (L) in front of a vehicle occupant (12) seated in the front seat (14), wherein a baffle (Continued)

(24) of the airbag (20) in the filled state is aligned transversely to the vehicle longitudinal direction (L) and faces the vehicle occupant (12). In a situation of restraint, it can be decided whether the airbag (20) is filled depending on whether the vehicle occupant (12) is touching a steering wheel (38) of the vehicle, wherein a steering wheel airbag is exclusively filled when a contact with the steering wheel (38) is detected.

15 Claims, 12 Drawing Sheets

(51) Int. Cl.
  *B60R 21/217* (2011.01)
  *B60R 21/2338* (2011.01)
  *B62D 1/19* (2006.01)

(52) U.S. Cl.
  CPC .......... *B60R 21/2338* (2013.01); *B62D 1/197* (2013.01); *B60R 2021/23382* (2013.01)

(56) References Cited

U.S. PATENT DOCUMENTS

| | | | | |
|---|---|---|---|---|
| 2016/0046319 | A1* | 2/2016 | Breton | B62D 1/197 280/775 |
| 2017/0174163 | A1* | 6/2017 | Korthauer | B60R 21/01512 |
| 2018/0162310 | A1 | 6/2018 | Szawarski et al. | |
| 2019/0161049 | A1* | 5/2019 | Thomas | B60R 21/264 |
| 2019/0381962 | A1 | 12/2019 | Sheldon et al. | |
| 2020/0055481 | A1 | 2/2020 | Mimura et al. | |
| 2020/0254956 | A1* | 8/2020 | Navarro Arranz | B60R 21/235 |

FOREIGN PATENT DOCUMENTS

| | | |
|---|---|---|
| DE | 19860827 A1 | 12/2012 |
| DE | 102014210494 A1 | 12/2015 |
| DE | 102015004973 A1 | 10/2016 |
| DE | 102018001991 A1 * | 9/2018 |
| DE | 102017124581 A1 | 4/2019 |
| DE | 10201813026 A1 | 5/2019 |
| DE | 102018203732 A1 | 9/2019 |
| DE | 102019112653 A1 | 12/2019 |
| WO | 2014/140437 A1 | 9/2014 |
| WO | 2017/001361 A1 | 1/2017 |
| WO | 2019/076673 A1 | 4/2019 |

OTHER PUBLICATIONS

Fisher et al., Instrument panel layout, Sep. 20, 2018, EPO, DE 10 2018 001 991 A1, Machine Translation of Description (Year: 2018).*

PCT International Search Report for corresponding International Application Serial No. PCT/EP2021/084736, mailed Mar. 11, 2022, pp. 1-6.

* cited by examiner

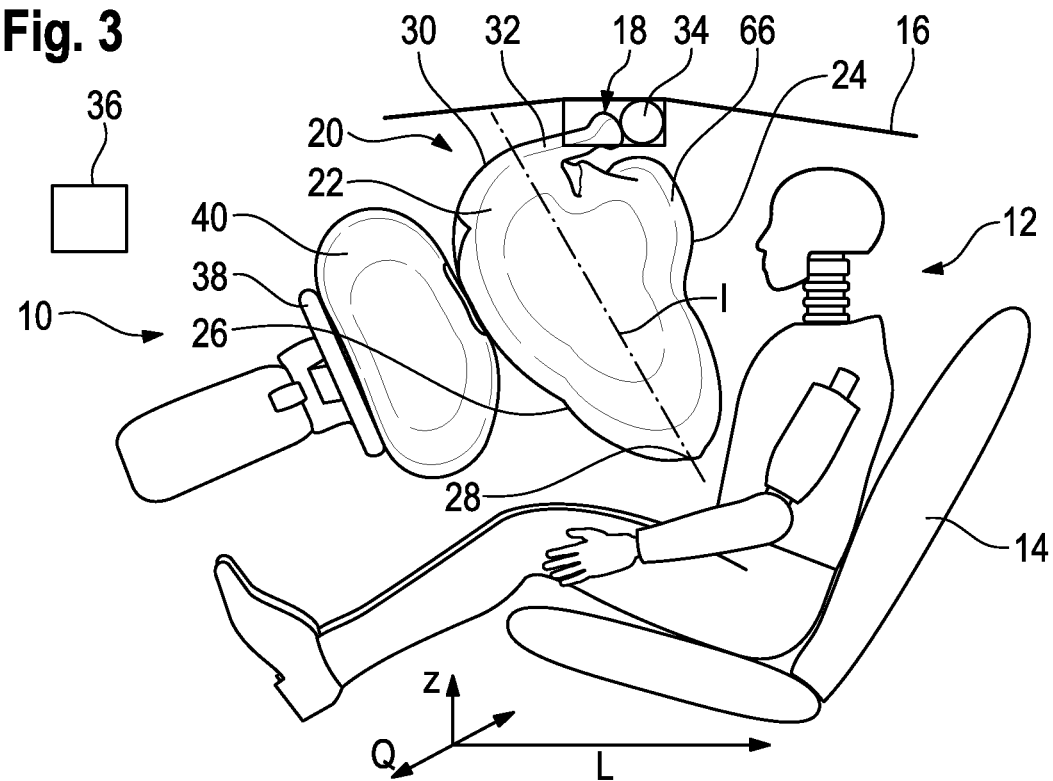
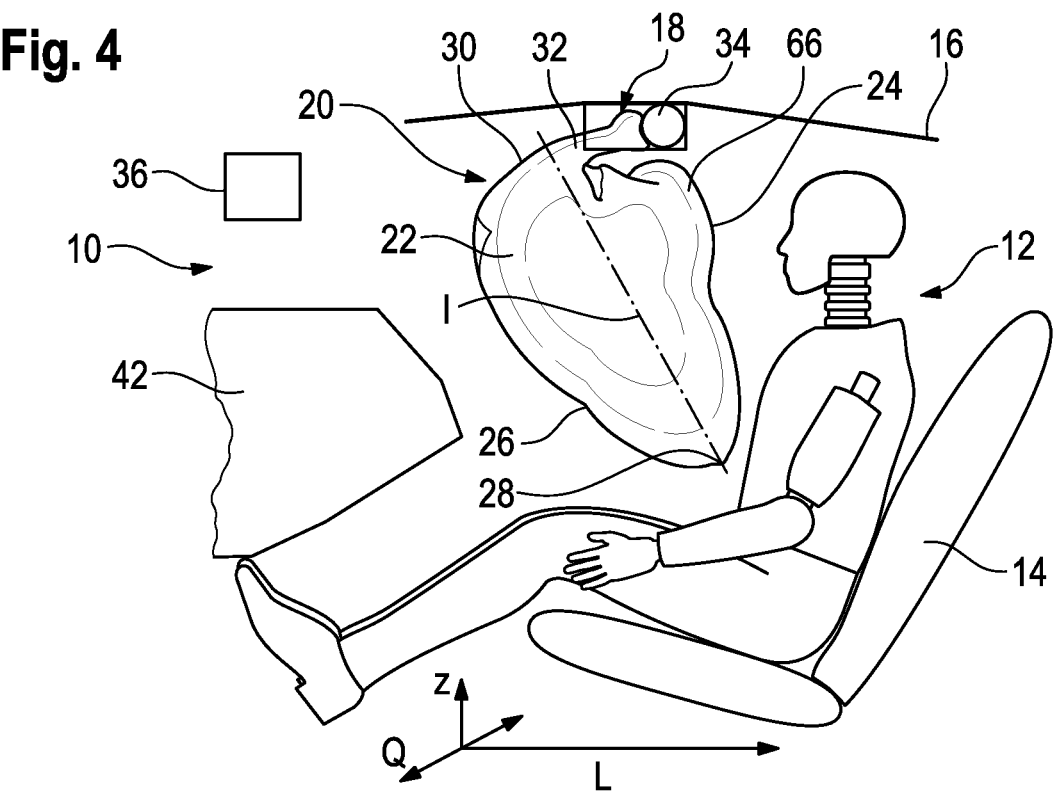

VEHICLE OCCUPANT RESTRAINT SYSTEM

RELATED APPLICATIONS

This application is a U.S. National Stage Application filed under 35 USC 371, claiming priority to Serial No. PCT/EP2021/084736, filed on 8 Dec. 2021; which claims priority from German Patent Application DE 10 2020 132 998.9, filed 10 Dec. 2020, the entireties of which are hereby incorporated herein by reference.

The invention relates to a vehicle occupant restraint system comprising an airbag module.

For protecting vehicle occupants in the front seats of the vehicle while they are moving forward along the vehicle longitudinal direction, mainly airbags which on the driver side deploy out of a steering wheel and on the passenger side deploy out of an instrument panel have been used so far.

In connection with autonomously driving vehicles, also alternatives to the classic steering wheel are being discussed, however, such as solutions in which, in autonomous driving situations, the steering wheel is immersed behind an interior lining of the vehicle to enlarge the space available in the vehicle interior. There are also made approaches of replacing the steering wheel with a smaller and lighter operating element that can be flapped to the side or folded, when it is not required in autonomous driving situations. For reasons of space, many light-weight and small operating elements do not allow for installing an airbag module therein. Consequently, in all those cases, at least in certain driving situations there is no steering wheel airbag disposed in the steering wheel available in a situation of restraint.

It is the object of the invention to provide a safe restraining effect for a vehicle occupant sitting in a front seat, especially for a driver seat.

This object is achieved by a vehicle occupant restraint system comprising an airbag module that is disposed in a roof area of a vehicle and is assigned to a front seat, the airbag module comprising an airbag that is arranged to deploy in the vehicle longitudinal direction in front of a vehicle occupant sitting in the front seat, wherein a baffle of the airbag in the filled state is aligned transversely to the vehicle longitudinal direction and faces the vehicle occupant.

Hence, the baffle adopts substantially the same position as the baffle of a conventional driver or passenger airbag, whereas the airbag module is arranged, however, in the roof area above the respective front seat and especially along the vehicle longitudinal direction toward the vehicle front end ahead of a seat back of the respective front seat.

The baffle should be located, in the filled state of the airbag, in front of the head and the upper torso of the vehicle occupant sitting in the assigned vehicle seat.

Thus, the protective effect by the airbag can be achieved, for example, irrespective of whether a steering wheel comprising a steering wheel airbag is located ahead of the front seat. Moreover, also the instrument panel can be designed independently of considerations concerning the arrangement of an airbag module, which broadens the options of design.

In the space between the head of the vehicle occupant and the airbag module disposed at the roof, usually no airbag volume is required for the protection of the vehicle occupant. This portion of the airbag therefore can be used for positioning the airbag in the vehicle interior. For example, the airbag may have a neck that extends between the airbag module and a body of the airbag. The neck has only a small filling volume and both in the vehicle longitudinal direction and in the vehicle transverse direction provides a significantly smaller expansion than the body of the airbag. The baffle and a rear side opposed to the baffle are formed on the body of the airbag.

The airbag, especially the body of the airbag, may take any suitable shape, especially a shape which is well suited for contacting the vehicle occupant at an early stage.

For this purpose, it is possible, for example, to compose the baffle of the airbag of two or more cut parts connected in portions at outer edge portions, wherein the shape of the cut parts and especially the contour of interconnected outer edge portions of the cut parts is selected, for example, so that, in the filled state of the airbag, a bulge of part of the baffle toward the vehicle occupant is formed.

To this end, for example an area of the baffle may be composed of at least two cut parts adjoining along the vehicle transverse direction. The outer edge portions of the two cut parts are arranged so that, in the filled state of the airbag, the resulting connection is located along the vehicle transverse direction between the surfaces of the two cut parts. In this way, in the central portion of the baffle relating to the vehicle transverse direction a bulge is formed that is directed to the vehicle occupant. Accordingly, the aim is to increase the volume of the airbag and a depth along the vehicle longitudinal direction in a defined area so as to establish contact with the vehicle occupant as early as possible.

The appropriate selection of the shape of the cut parts helps produce a specific bulge in a desired portion of the baffle. Accordingly, a bulge in the area of the baffle which is provided to absorb the occupant's head, i.e., an upper portion of the baffle in the filled state of the airbag, has turned out to be well suited.

The outer edge portions can be connected in a known way, such as by sewing, gluing or welding.

For example, exactly two separate cut parts are used.

The cut parts can be completely separate from each other or can be interconnected in a short portion, before they are connected at their edge portions. If the cut parts are connected to each other, the cut parts are defined by including edge portions to be interconnected, wherein a respective one of the edge portions can be associated with the one cut part and the other edge portion can be associated with the other cut part.

Preferably, the two cut parts are configured and arranged to be mirror-symmetric.

In one possible configuration, each of the two cut parts has a laterally projecting area, said two areas defining the bulge in the composed and filled airbag.

In this case, the outer edge portions of the cut parts which are being interconnected are of equal length and equal shape.

However, generally it is also possible to connect differently shaped edge portions of different cut parts. Usually, this results in an airbag which cannot be completely flatly spread. As a rule, the baffle cannot be flatly spread, either.

The rear side of the airbag opposed to the baffle in the filled state is preferably materialized by one single coherent cut part.

It is another option of influencing the shape of the airbag to arrange, inside the airbag, at least one tether that acts on the baffle of the airbag and limits an expansion of the filled airbag along the vehicle longitudinal direction.

Preferably, the tether connects the baffle and the rear side of the airbag to each other. For example, the tether extends, in the filled state of the airbag, about horizontally or obliquely upward from an attachment point on the baffle.

Directional indications such as "upward" or "downward" in this application always relate to the airbag in the mounted and filled state and thus to a Z-direction of the vehicle.

A preferred attachment point of the tether on the baffle is located just above an area at the upper end of the baffle that is provided for absorbing the head of the vehicle occupant.

When the baffle includes a bulge in this area serving to absorb the head of the vehicle occupant, the tether then may act on the baffle just above the bulge.

There may be provided plural tethers, especially exactly two tethers.

Preferably, the attachment point of the second tether on the baffle is located just below the area that is provided for absorbing the head of the vehicle occupant, especially just below the bulge.

In this way, a depth of the airbag can be adjusted along the vehicle longitudinal direction and the shape of the airbag can be influenced.

In one possible embodiment, the two tethers are arranged in parallel to each other.

In another possible embodiment, the two tethers are interconnected inside the airbag so that together they take a Y-shape, wherein the stem of the Y extends especially to the upper end of the rear side, while the arms of the Y end at the baffle.

Normally, the tether is not provided to detach from its attachment points on the baffle and the rear side, to extend or to split when the vehicle occupant is absorbed by the airbag. During the entire situation of restraint, the tether should remain intact and connected to the baffle and the rear side.

The use of those tethers is independent of the shape of the baffle.

Of preference, an airbag retraction mechanism is provided that is configured to move the airbag away from a range of view of the vehicle occupant, viz. from a windscreen of the vehicle, after filling. This applies especially when the airbag is assigned to a driver seat so as to enable the driver to have an unobstructed forward view as quickly as possible again.

As a matter of course, the airbag retraction mechanism should not become active before the vehicle occupant has been safely absorbed and the airbag is at the end of its normal service life.

To this end, the airbag may include, as is conventionally known, vents through which the filling gas escapes from the airbag during and after absorption of the vehicle occupant.

The airbag retraction mechanism is preferably configured to pull the airbag toward the roof and thus upward out of the vehicle occupant's field of view.

For example, the airbag retraction mechanism is pyrotechnically operated, with a pyrotechnic propelling charge which is disposed, e.g., in the airbag module being activated. It would also be imaginable to use a mechanical device acting through spring force, for example.

The airbag retraction mechanism can interact with and shorten a tether inside or on the outer side of the airbag, e.g., by gathering or furling, to lift a lower end of the airbag upward.

It is possible in this case to make use of one of the afore-described shaping tethers extending inside the airbag and to connect a retraction tether, for example, to any one of said tethers.

The airbag retraction mechanism can also be used, of course, independently of further tethers extending inside the airbag.

The airbag module preferably comprises the folded airbag and an inflator, the inflator being a tubular inflator that is arranged in parallel to a vehicle transverse direction especially in the area of a sun visor mounted in the roof area. In this position, the airbag module can be easily fastened to a roof cross-member, while a forward and downward deployment direction of the airbag is possible. Thus, the airbag can exit the airbag module away from the vehicle occupant and then can position itself directly downward in front of the vehicle occupant.

It is possible to choose a module housing made from sheet steel but also made from any other suitable material. A rigid module housing can be advantageous, as it protects the fixation of the sun visor during deployment of the airbag.

The inflator may be arranged behind the folded airbag in the vehicle longitudinal direction. The airbag then deploys between the sun visor and the windscreen, when viewed in the vehicle longitudinal direction.

It has turned out that, when a tubular inflator having an as small diameter as possible is used, the entire module height can be limited to about 35 mm.

Based on the vehicle transverse direction, the airbag module should be disposed above the respective assigned front seat. Accordingly, for the airbag a deployment direction in parallel to the upper torso of the vehicle occupant can be chosen.

In the completely deployed and filled state, a lower end of the airbag is preferably located beneath a thorax of the vehicle occupant. When a steering wheel is provided, the airbag should extend beyond the lower end of the steering wheel.

Basically, the vehicle occupant restraint system can be used at each seating position of a vehicle irrespective of whether or not a steering wheel is assigned to the respective vehicle seat. The airbag may as well replace a conventional frontal airbag that is mounted, e.g., in front of the vehicle seat in the steering wheel or in the instrument panel.

It is also possible to make use of identical airbag modules for all front seats such as a driver seat and a passenger seat. When in the vehicle two front seats are juxtaposed along the vehicle transverse direction, for example, in the roof area two identical airbag modules juxtaposed along the vehicle transverse direction and each including one airbag can be disposed. Consequently, it is no longer necessary to provide different airbags for the driver seat and the passenger seat, which helps reduce the costs.

The vehicle may include a steering wheel, wherein the steering wheel does not comprise its own steering wheel airbag, in predetermined driving situations is located in a position where it cannot be operated by the vehicle occupant and/or wherein a sensor system is provided for detecting whether the vehicle occupant is touching the steering wheel.

When the steering wheel is disposed in front of the driver seat, the airbag should always be arranged, of course, so that it will deploy between the vehicle occupant and the steering wheel.

When the airbag is assigned to a driver seat, i.e., to a vehicle seat that at least temporarily is provided with a steering wheel, the airbag can adopt the sole function of a frontal airbag, if either the steering wheel does not have its own airbag, the steering wheel is currently immersed in the lining, for example, or, based on predetermined parameters, the sensor system detects that would be adverse if the steering wheel airbag were activated.

It is equally possible, if the steering wheel is provided with its own steering wheel airbag, to fill the steering wheel airbag only when predetermined parameters are detected, such as, e.g., particular positions or arm postures of the vehicle occupant.

Where necessary, the airbag can also be filled in addition to a steering wheel airbag, equally optionally in response to predetermined parameters of the sensor system.

The vehicle occupant restraint system therefore is also suited for semi-autonomously or fully autonomously driving vehicles in which an action taken by the driver is not required or is only required in particular driving situations in a manual driving mode.

It is possible to provide, instead of a classic steering wheel, an operating element that can be immersed or folded behind lining parts, for example, when the vehicle is driving autonomously, but is available to the driver in a manual mode. This operating element may include its own steering wheel airbag, or it may be designed without its own steering wheel airbag, when the space required for the latter is missing, for example.

When a steering wheel airbag is present, it is possible to operate the vehicle occupant restraint system in a method according to the invention such that, in a situation of restraint, it is decided whether the airbag is filled depending on whether the vehicle occupant is touching the steering wheel. In the cases in which the driver is actively steering the vehicle and thus keeps his/her hands on the steering wheel and a contact with the steering wheel is detected, e.g., by one of the sensors of the sensor system detecting a contact with the steering wheel, exclusively the steering wheel airbag is filled. The airbag of the airbag module disposed in the roof area is not activated, on the other hand, as in this case the steering wheel airbag offers the more favorable restraining effect.

If, however, the driver does not keep his/her hands on the steering wheel, because the vehicle is in a semi-autonomous or fully autonomous driving situation, either only the airbag of the airbag module disposed in the roof area can be filled, or said airbag can be filled in addition to the steering wheel airbag, as in this case a better restraining effect can be achieved by the airbag deploying directly ahead of the vehicle occupant. Especially, in this way an earlier contact can be obtained between the airbag and the vehicle occupant, because the baffle can be positioned more closely to the vehicle occupant.

As a matter of course, even other parameters such as the weight and the height of the vehicle occupant as well as the seat spacing and/or a seat back position may be considered when deciding whether only the steering wheel airbag, only the airbag of the airbag module disposed in the roof area or both airbags are to be filled.

If there is basically no steering wheel airbag present or if, in the situation of restraint, the steering wheel is in a position the vehicle occupant cannot reach, exclusively the airbag of the airbag module disposed in the roof area is filled, as a matter of course.

In yet another variant, a steering wheel positioning mechanism is provided that is configured to move, in a situation of restraint, the steering wheel away from the vehicle occupant seated in the front seat. In a situation of restraint, the entire steering wheel is retracted, for example linearly, in the direction to the vehicle front end or is pivoted upward or downward. In this way, the space for the legs of the vehicle occupant can be enlarged in the situation of restraint. In this event, the steering wheel should not include its own steering wheel airbag. Then the airbag of the airbag module disposed in the roof area acts as the sole frontal airbag.

Furthermore, it can be provided that the steering wheel positioning mechanism is configured to move, already when sensing a pre-crash situation and thus immediately prior to the occurrence of the actual situation of restraint, the steering wheel away from the vehicle occupant seated in the front seat. A pre-crash situation describes in particular an event in which it is detected by suitable sensor elements and a controller of the vehicle occupant protection system that a situation of restraint will occur or is at least likely to occur. The sensor elements can be, for example, configured as radar, lidar, infrared and/or camera elements for monitoring the vehicle and/or the vehicle environment and/or the driving situation of the vehicle. By such detection of a pre-crash situation of course also the airbag of the airbag module disposed in the roof area or further systems for protecting the vehicle occupant may be activated earlier, for example, for reaching a more ideal positioning of the airbag or for moving the vehicle occupant in a better position for restraint.

The steering wheel positioning mechanism may be pyrotechnically or mechanically or electromechanically driven.

In general, the airbag of the vehicle occupant protection system described here is not limited to being used for front seats but can be implemented for any vehicle seat, even if no proper steering wheel or other operating element is provided for such vehicle seat.

In the following, the invention will be described in detail by means of several embodiments with reference to the attached figures, wherein, in the drawings:

FIGS. 1 to 4 show a schematic side view of a vehicle occupant restraint system according to the invention with a completely filled airbag;

Figure 30:
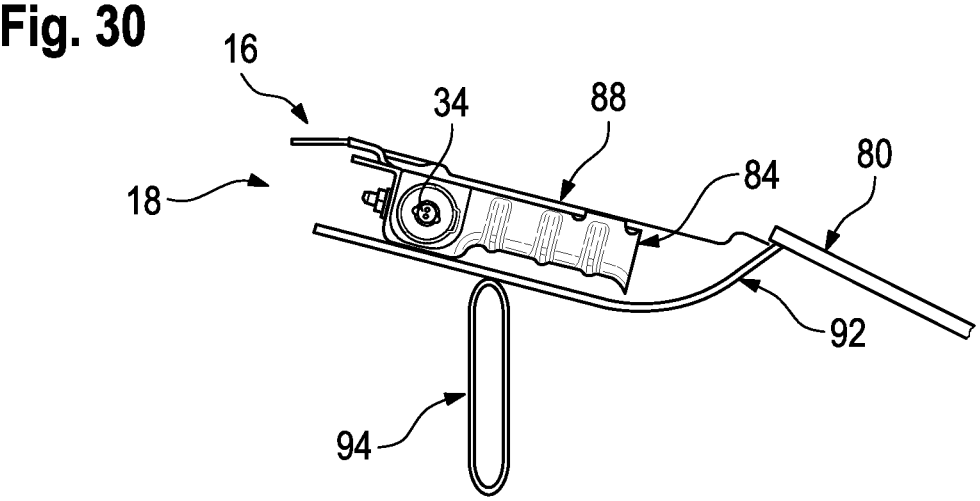
Figure 31:
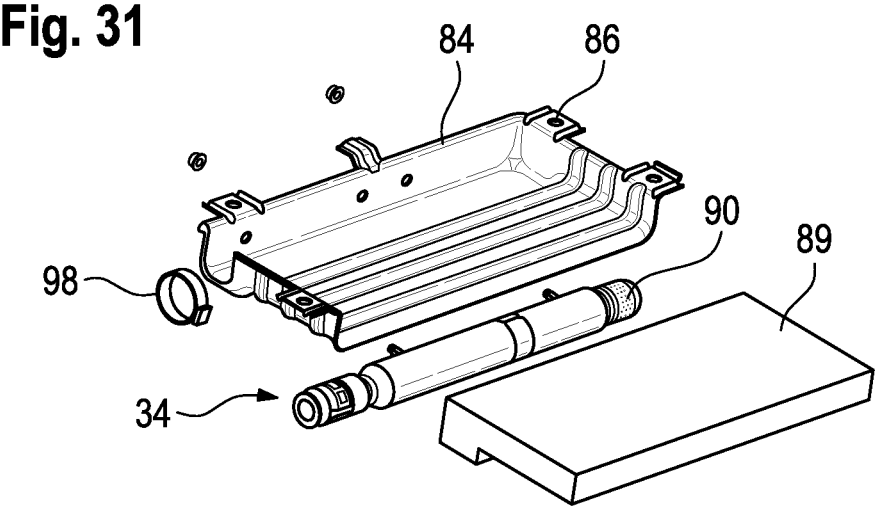
Figure 32:
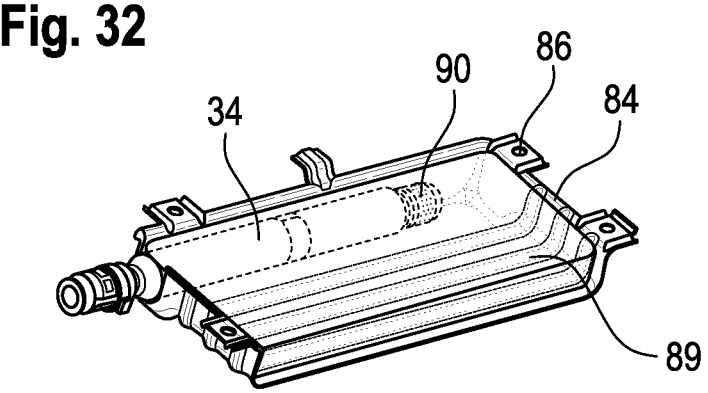
Figure 33:
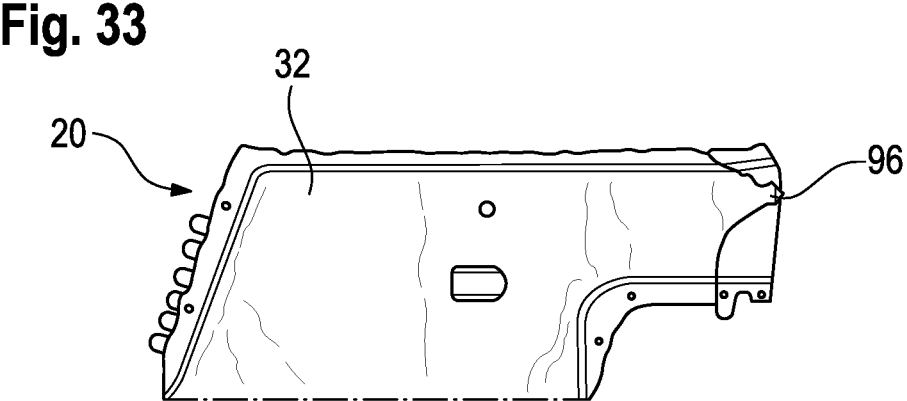
Figure 34:
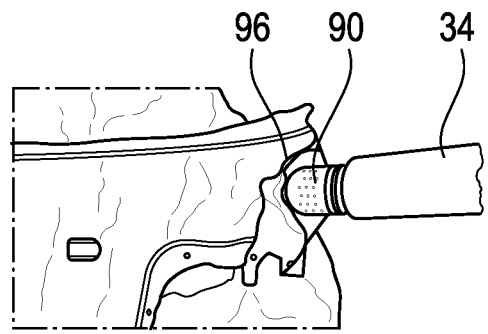
Figure 35:
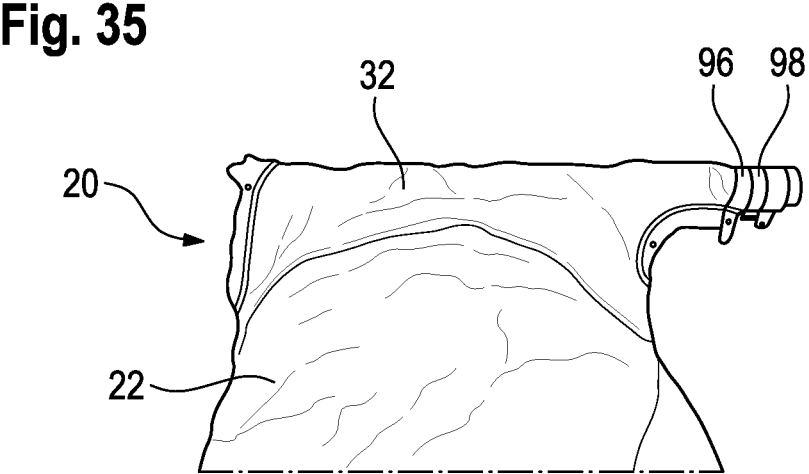

FIGS. 30 to 32 schematically show the structure of an airbag module of the vehicle occupant restraint system according to the invention; and FIGS. 33 to 35 schematically show the arrangement of an inflator in the airbag of the vehicle occupant restraint system according to the invention.

FIGS. 1 to 4 illustrate a vehicle occupant restraint system 10 which in this case is designed for a vehicle occupant 12 seated in a front seat 14. In a roof area 16 of the vehicle, an airbag module 18 assigned to the respective front seat 14 is disposed. Therefore, the airbag module 18 is located, relating to both a vehicle longitudinal direction L and a vehicle transverse direction Q, above the front seat 14, in this case approximately above the thighs of the vehicle occupant 12 (indicated in FIG. 1, for example).

Figure 1:
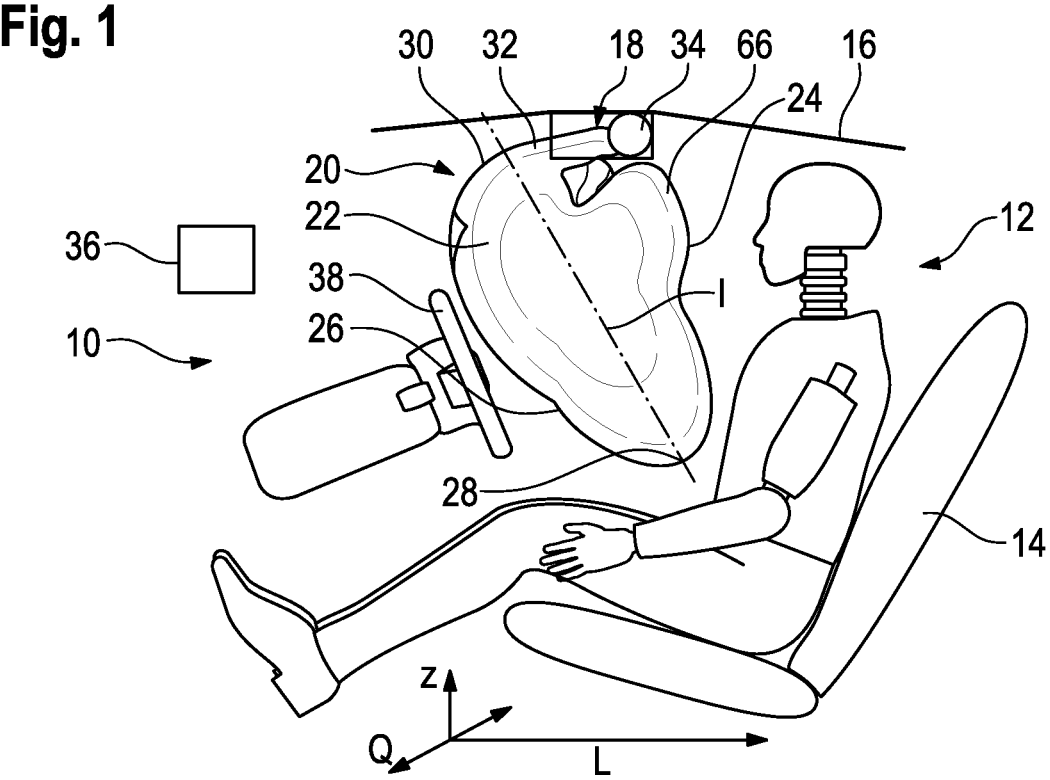

The airbag module 18 includes an airbag 20 shown in a completely filled state in FIGS. 1, 3 and 4.

The airbag 20 comprises a body 22 which accounts for a major part of the filled volume of the airbag 20 and on which a baffle 24 facing the vehicle occupant 12 is formed. On the side opposed to the baffle 24, the body 22 of the airbag 20 includes a rear side 26. The contour of the baffle 24 and the rear side 26 defines a longitudinal axis I of the airbag 20 extending from a lower end 28 to an upper end 30. In this example, the lower end 28 is also marked by the point where the baffle 24 and the rear side 26 are connected to each other.

At the upper end 30, the body 22 of the airbag 20 merges into a narrow neck 32 that connects the body 22 to an inflator 34 of the airbag module 18 (indicated in FIG. 1, see also FIGS. 30 to 35). The neck 32 has a considerably smaller filling volume than the body 22 and is formed to be narrower than the body 22 both in the vehicle longitudinal direction L and in the vehicle transverse direction Q.

Whereas the body 22 provides the volume required for absorbing the vehicle occupant 12, the neck 32 serves for connecting the body 22 to the airbag module 18 and for positioning the airbag 20 at the desired location in the vehicle interior.

In this example, in the vehicle a sensor system 36 is provided comprising a controller not shown in detail as well as various sensors which can detect, for example, a position of the front seat 14, a position of the vehicle occupant 12 and/or a current driving situation of the vehicle.

In this example, the vehicle includes a steering wheel 38 assigned to the front seat 14 so that the vehicle occupant 12 can grip it to manually steer the vehicle.

Moreover, in this example in the steering wheel 38 its own steering wheel airbag 40 that can be filled in a situation of restraint to absorb the vehicle occupant 12 is disposed.

The sensor system 36 here also comprises a sensor that detects whether or not the vehicle occupant 12 is touching the steering wheel 38, which reveals whether or not the hands of the vehicle occupant 12 are positioned on the steering wheel 38.

This is usually the case when the vehicle is moving and the vehicle occupant 12 manually steers the vehicle. In a driving situation in which the vehicle drives fully autonomously or semi-autonomously, the vehicle may happen to travel in the traffic, but the vehicle occupant 12 is not manually steering the vehicle and therefore is not keeping his/her hands on the steering wheel 38 for quite some time.

In a possible method for operating the vehicle occupant restraint system this detection is utilized to decide in a situation of restraint whether or not the airbag is to be filled.

If it is detected that the vehicle occupant 12 is not touching the steering wheel 38, possibly for a predetermined period of time, then exclusively the airbag 20 but not the steering wheel airbag 40 is filled. This situation is illustrated in FIG. 1.

Figure 2:
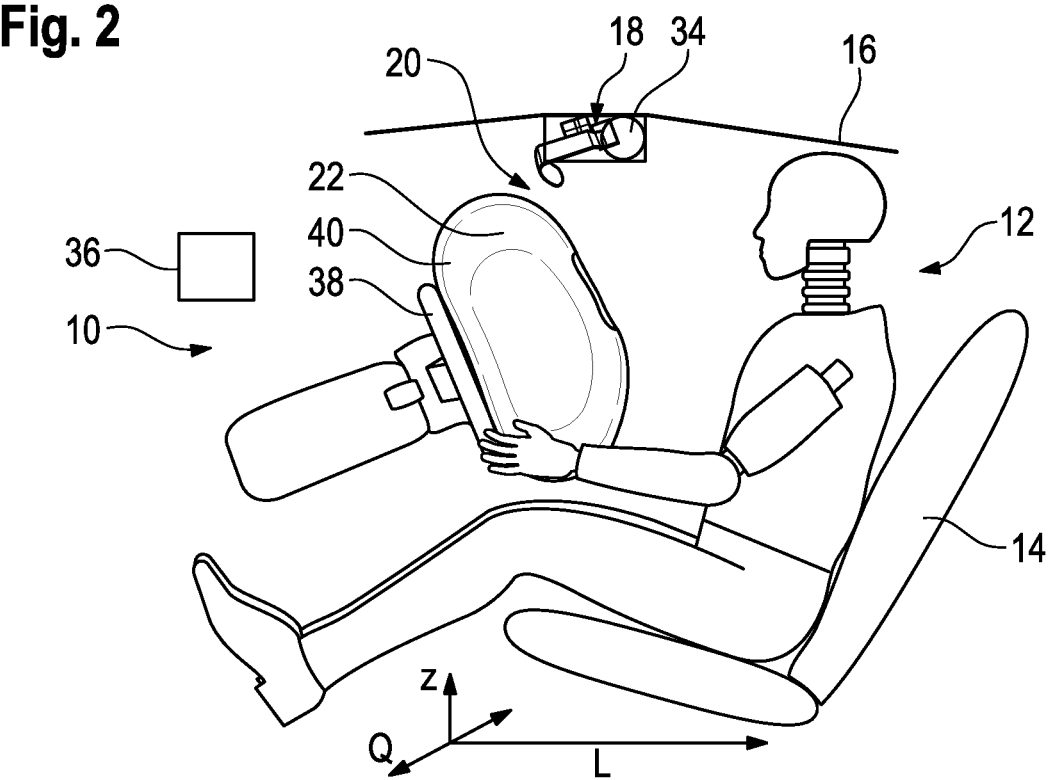

If it is detected, however, that the vehicle occupant 12 is gripping the steering wheel 38, then exclusively the steering wheel airbag 40 but not the airbag 20 is filled (see FIG. 2).

It is optionally possible, in a driving situation in which the vehicle occupant 12 is largely spaced from the steering wheel 38, for example, because the front seat 14 is run far back, to fill both the airbag 20 and the steering wheel airbag 40, as sketched in FIG. 3.

FIG. 4 illustrates a driving situation in which the steering wheel 38 is immersed behind a lining 42 in a fully autonomous or semi-autonomous driving situation and, thus, in a situation of restraint the steering wheel airbag 40 is not available, either. If in this driving situation a situation of restraint occurs, then exclusively the airbag 20 will be filled, of course.

The same situation is given, as a matter of course, when the steering wheel 38 does not include its own steering wheel airbag 40. Then basically the airbag 20 is filled in the situation of restraint.

Alternatively, FIG. 4 shows a front seat 14 to which no steering wheel is assigned, for example a passenger seat, wherein in such case the lining 42 is formed by an instrument panel.

In one example, identical airbag modules 18 in the roof area 16 are assigned to all front seats 14 of the vehicle. It is also possible, of course, to provide airbag modules 18 for other vehicle seats such as in the rear area or in coaches.

Figure 5:
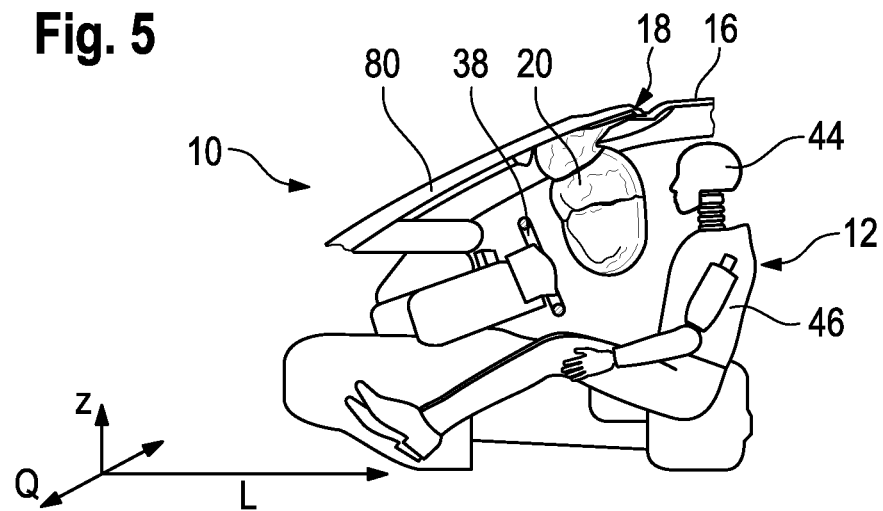
FIGS. 5 to 7 show the sequence of a situation of restraint using the vehicle occupant restraint system of FIG. 1.
Figure 6:
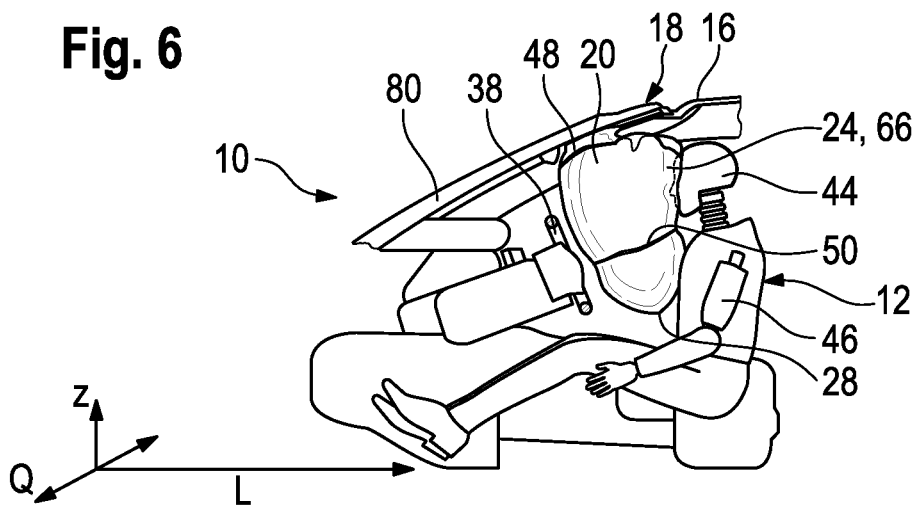
Figure 7:
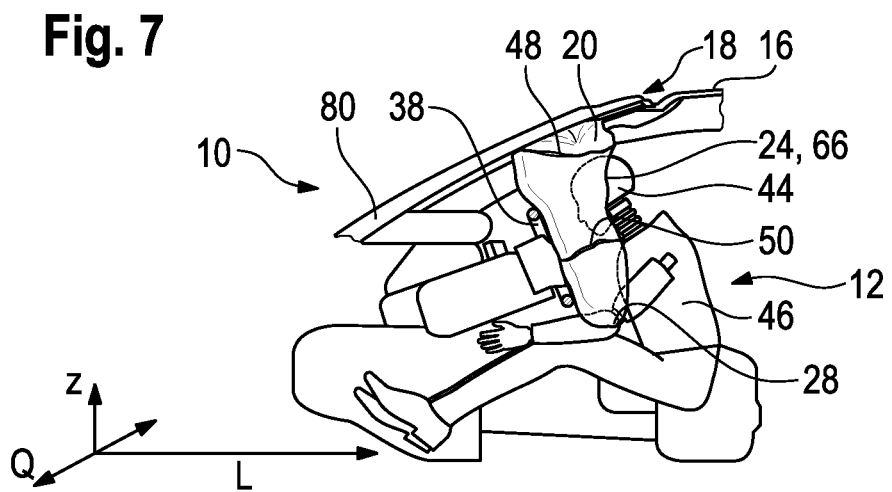

FIGS. 5 to 7 illustrate the sequence of a situation of restraint. It is visible that the airbag 20 deploys from the roof area 16 substantially perpendicularly downwards (Z-direction) between the vehicle occupant 12 and the steering wheel 38, the baffle 24 being placed in front of a head 44 and an upper torso 46 of the vehicle occupant 12. As illustrated in FIG. 6, the airbag 20 reaches this position before the vehicle occupant 12 immerses into the airbag 20. The airbag 20 absorbs the head 44 and the upper torso 46 of the vehicle occupant 12 by the baffle 24, as is evident from FIG. 7.

Figure 8:
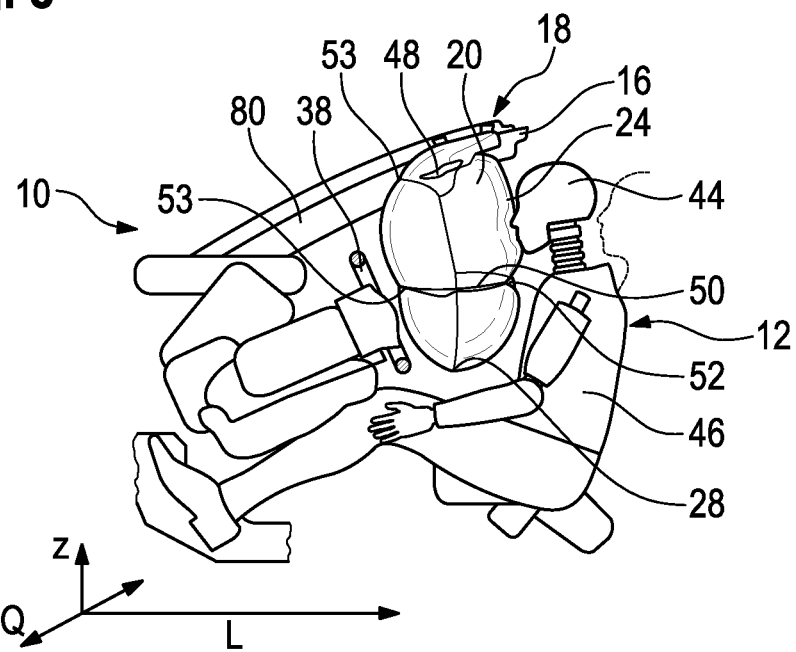
FIGS. 8 and 9 show a vehicle occupant being absorbed by an airbag of the vehicle occupant restraint system of FIG. 1.
Figure 9:
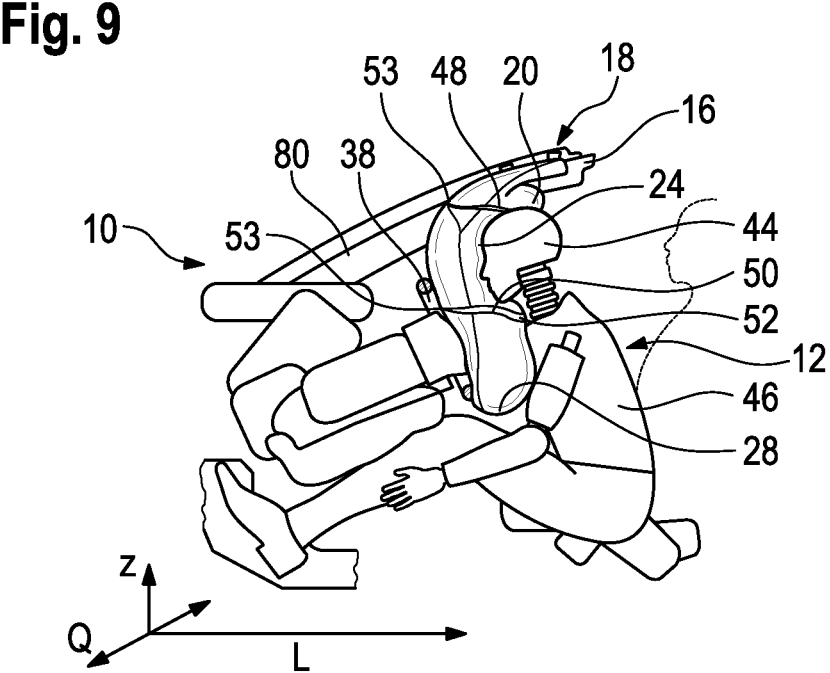

FIGS. 8 and 9 once again illustrate the vehicle occupant 12 being absorbed in a situation of restraint.

Also, it is visible in said Figures that inside the airbag 20 two tethers 48, 50 are provided each of which acts by one end with an attachment point 52 on the baffle 24. In this example, the tethers 48, 50 extend approximately in parallel to each other and approximately horizontally, and each tether is connected to the rear side 26 by an attachment point 53 opposed to the attachment point 52.

The tethers 48, 50 restrict an expansion of the filled airbag 20 along the vehicle longitudinal direction L.

It would also be possible to use only one tether or more than two tethers.

All tethers 48, 50 in this case are configured so that, throughout the entire situation of restraint, they remain tightly connected to the baffle 24 and the rear side 26 and also remain intact in themselves and maintain the same length.

The attachment points 52 on the baffle 24 are disposed here above and below an area of the baffle 24 on which the head 44 of the vehicle occupant 12 impacts.

FIGS. 10 to 25 illustrate the cut of the surface area of the airbag 20, more exactly of the body 22, in detail for different shapes of the filled airbag 20.

In general, a large variation of shapes for the filled body 22 can be obtained by the shape of the individual cut parts.

The principle of shaping is based on the fact that outer edge portions of different cut parts of equal length are connected to each other so that together they result in an arched surface having a larger surface area than the resulting peripheral edge. Since the respective outer edge portions have equal lengths, they can be connected without any gatherings or darts being required.

The length and the contour of the outer edge portions decide on the shape. However, it is not important whether the individual cut parts are completely separate pieces of fabric or whether they are integrally connected in places to each other at portions which, in the case of separate cut parts, would be connected by a straightly extending connection.

All cuts shown here follow this basic principle.

The rear side 26 of each body 22 of the airbag 20 is formed of one single cut part 54, whereas the baffle 24 is made from one or more cut parts.

Figure 10:
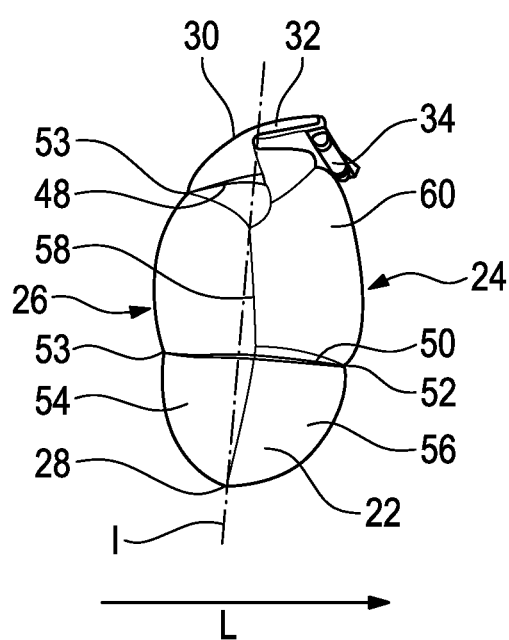
FIGS. 10 to 12 show the vehicle occupant restraint system of FIG. 1 with a first variant of the airbag.
Figure 11:
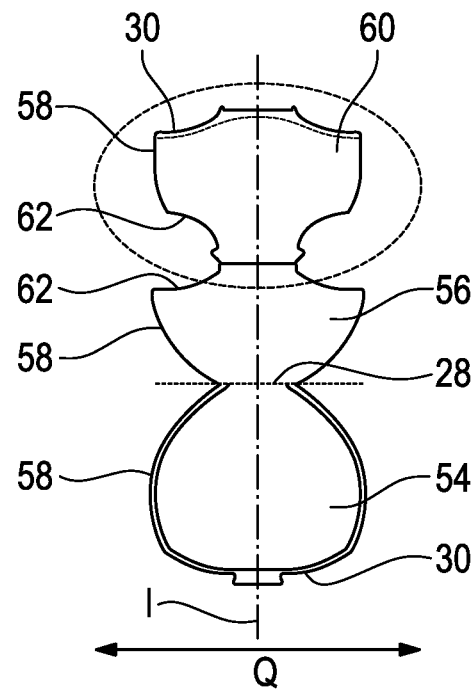
Figure 12:
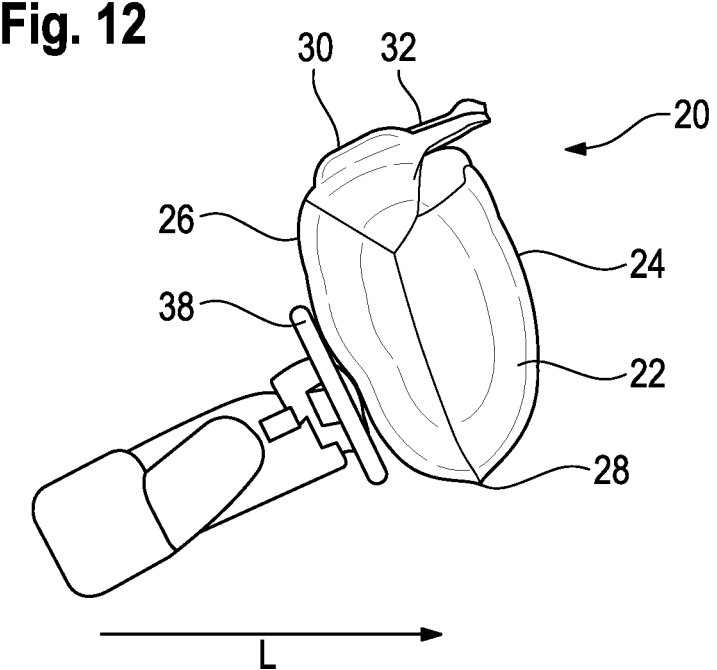

FIGS. 10 to 12 illustrate a first example.

The cut part 54 is connected to an adjacent cut part 56 of the baffle 54 at the lower end 28 of the body 22. The two cut parts 54, 56 may be formed integrally or may initially be separated from each other.

The baffle 24 is composed, in this example, of the cut part 56 and another cut part 60 that is adjacent to the cut part 56 on the opposite side of the cut part 54. The cut parts 54, 56, 60 are lined up along the later longitudinal axis I of the body 22.

In the finished airbag 20, adjacent outer edge portions 58 of the two cut parts 54, 56, 60 are connected to each other in a known manner (e.g., by sewing, gluing or welding) and together form a peripheral connection at which the baffle 24 and the rear side 26 adjoin each other, as illustrated in FIG. 10.

The two cut parts 56, 60 forming the baffle 24 are moreover interconnected at outer edge portions 62. This imparts a per se three-dimensional shape to the baffle 24 so that the baffle 24 cannot be completely flatly spread.

The outer edge portions 58, 62 to be interconnected are of equal length but may have different contours.

Each of the cut parts 54, 56, 60 is mirror-symmetrical in this case with respect to the longitudinal axis I.

Figure 13:
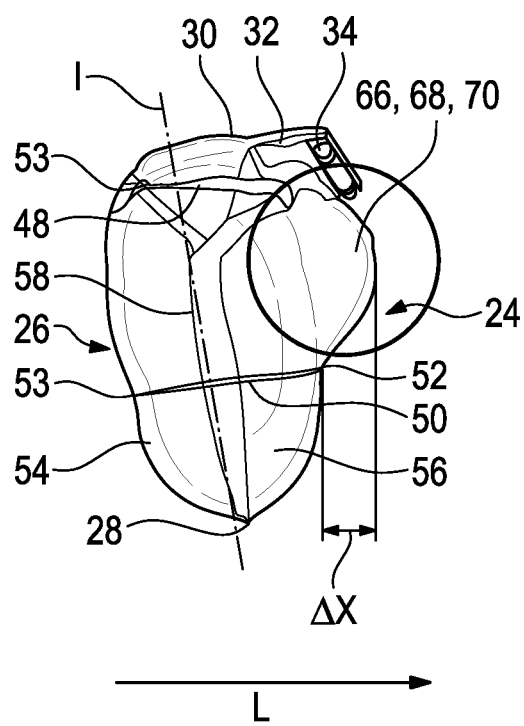
FIGS. 13 to 15 show the vehicle occupant restraint system of FIG. 1 with a second variant of the airbag.
Figure 14:
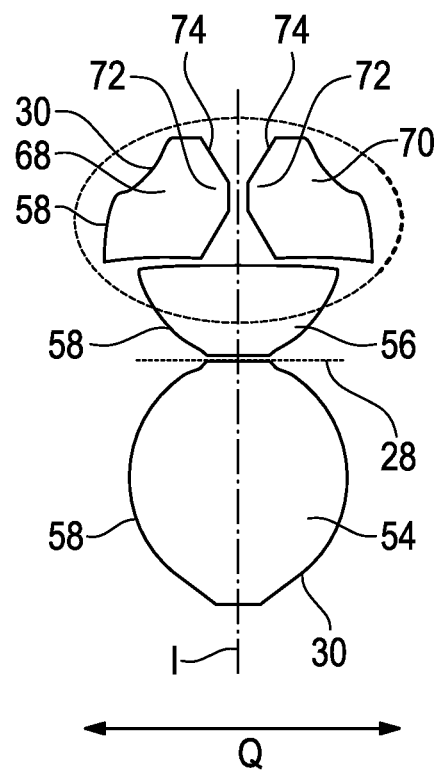
Figure 15:
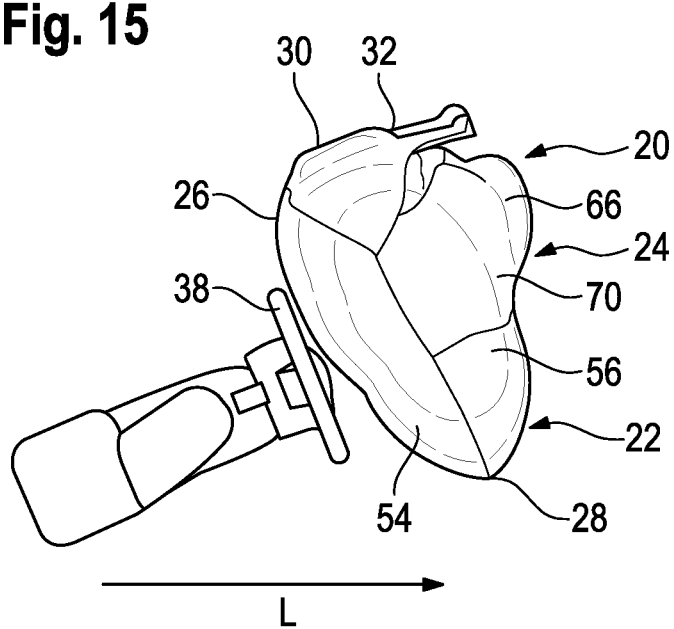

FIGS. 13 to 15 illustrate a shape of the body 22 of the airbag 20 in which the baffle 24 along the vehicle longitudinal direction L (in the mounted and filled state) includes a bulge 66 that extends toward the vehicle occupant 12 and allows him/her to contact the airbag 20 at an early stage (see also FIGS. 1, 3 and 4, for example).

The bulge 66 is located in the area of the baffle 24 that is provided for absorbing the head 44 of the vehicle occupant 12, and lies in an upper area of the baffle 24 (see FIG. 15, for example). As is illustrated in FIG. 13, the bulge 66 extends beyond the remaining baffle 24 by an amount Ax.

The tethers 48, 50 equally provided in this example act on the baffle 24 with each of their attachment points 52 above and below the bulge 66.

The bulge 66 is produced by the baffle 24 being composed of a total of three cut parts 56, 68, 70, as is shown in FIG. 14. The cut part 56 is, just as in the embodiment of FIGS. 10 to 12, approximately semicircular, but, in this case, is a separate part and is connected to the cut part 54 by a further connection.

The two cut parts 68, 70 are arranged mirror-symmetrically and next to each other (based on the vehicle transverse direction Q and the longitudinal axis I). Each of them includes a laterally projecting area 72, the two areas 72 facing each other and being connected to each other at their outer edge portions 74. In the filled airbag 20, the connected outer edge portions 74 are located, based on the vehicle transverse direction Q, in the center of the baffle 24.

As is evident from FIG. 13, the outer edge portions 58 of the cut parts 56, 68, 70 facing the cut part 56 are connected to the cut part 54.

Figure 16:
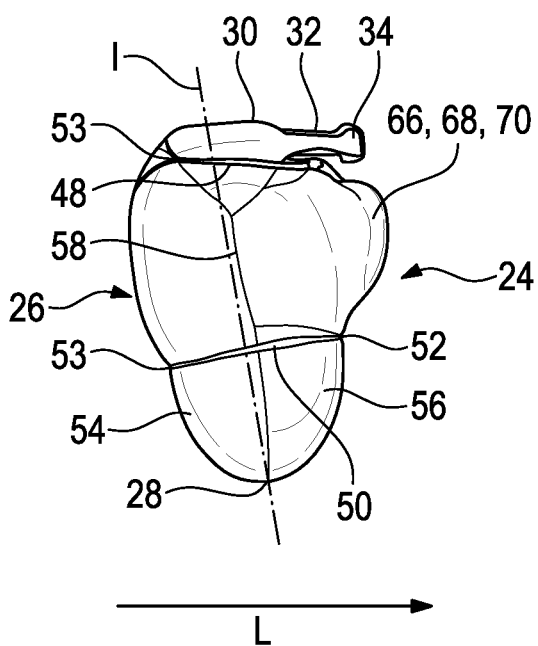
FIGS. 16 to 25 show different variants of the airbag of the vehicle occupant restraint system of FIG. 1.
Figure 17:
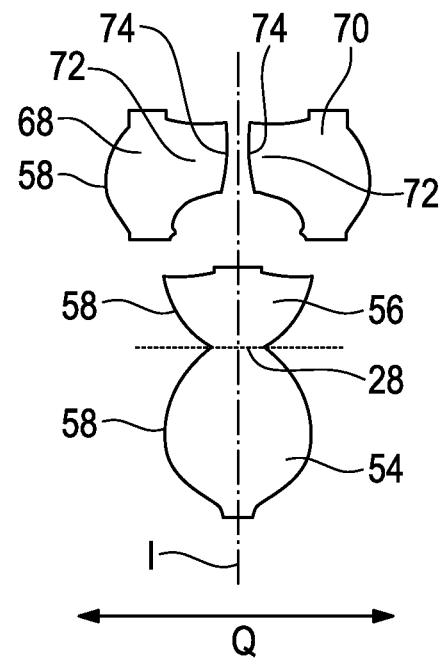

FIGS. 16 and 17 illustrate a second cutting shape by which a bulge 66 can be obtained. The difference from the variant shown in FIGS. 13 to 15 merely resides in the shape of the cut parts 68, 70.

Figure 18:
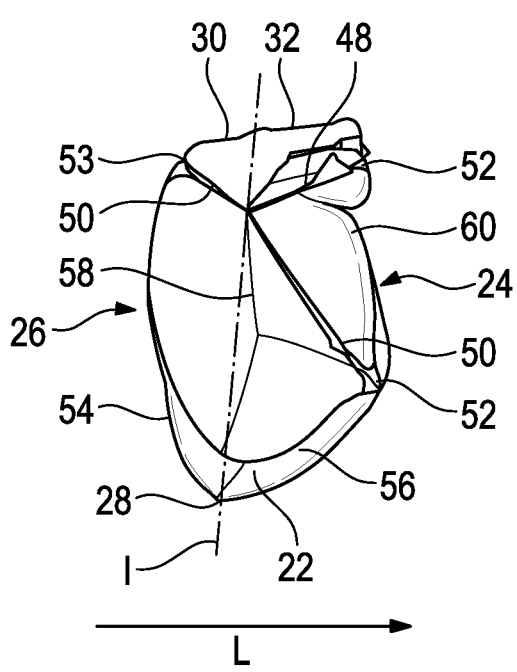
Figure 19:
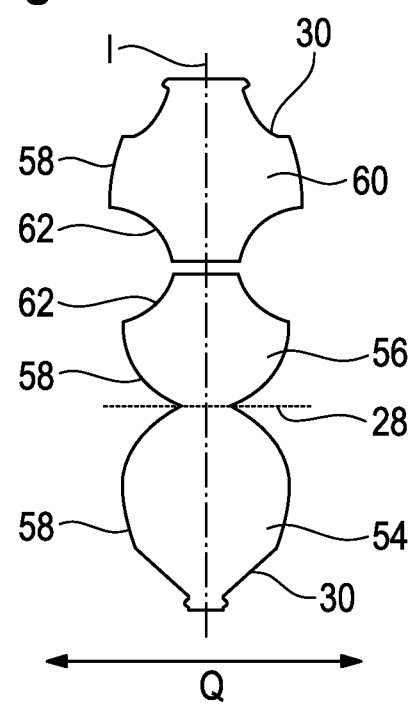
Figure 20:
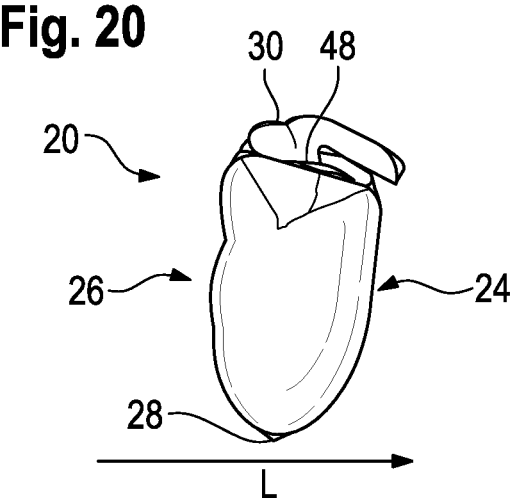
Figure 21:
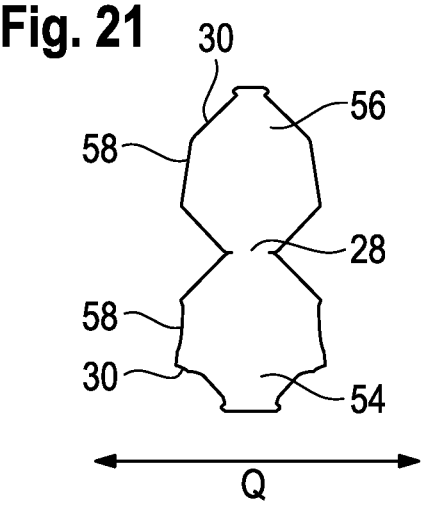
Figure 22:
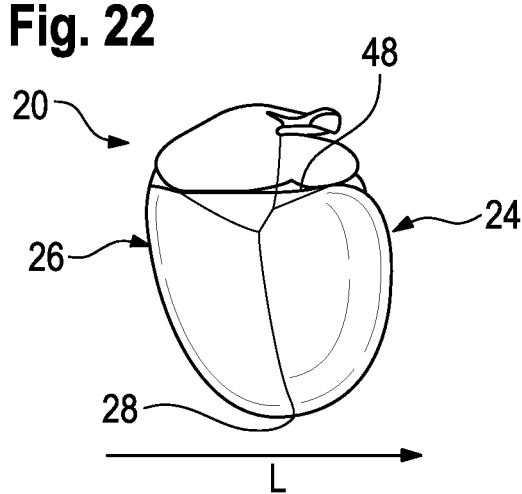
Figure 23:
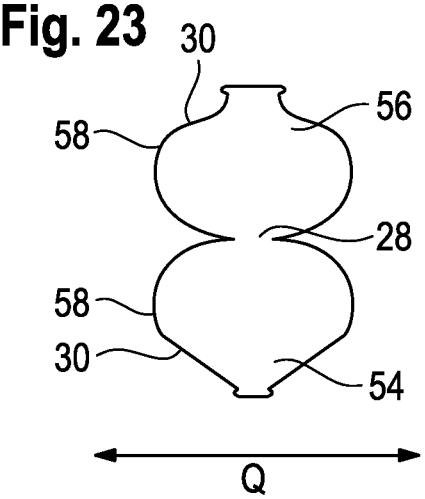
Figure 24:
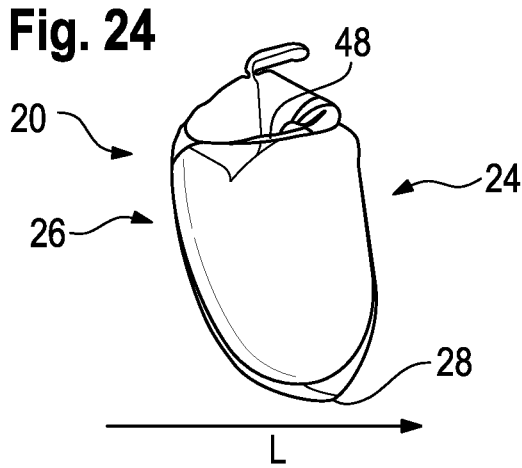
Figure 25:
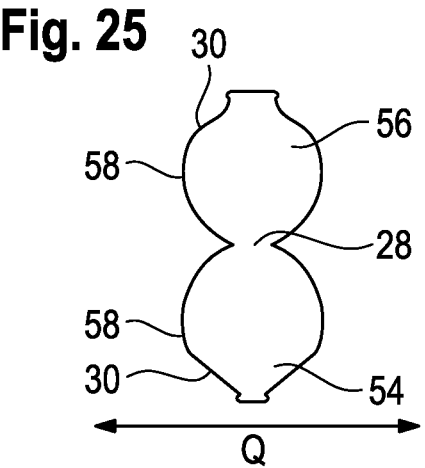

FIGS. 18 and 19 illustrate a variant the shape of which is similar to the airbag 20 of FIGS. 10 to 13.

In contrast to that, however, two tethers 48, 50 are disposed inside the airbag 20, the tethers being combined approximately level with the longitudinal axis I and from there leading, by one single tether portion, to one single attachment point 53 on the rear side 26. Thus, a Y-shaped tether is resulting whose arms end, corresponding to the tethers 48, 50, at respective attachment points 52 on the baffle 24. The lower tether 50 extends obliquely upward toward the upper end 30 of the body 22 of the airbag 20 and so-to-speak forms a stem of the Y. The attachment point 53 thereof is located at the upper end of the rear side 26, in the vicinity of the attachment of the neck 32, in this case.

FIGS. 20 to 25 illustrate variants of the airbag 20 in which even the baffle 24 is made of one single cut part 56 only. Here the three-dimensional shape is obtained by the differently formed contours of the outer edge portions 58 of the cut parts 54, 56.

Furthermore, in this example only the respective upper tether 48 is provided.

Figure 26:
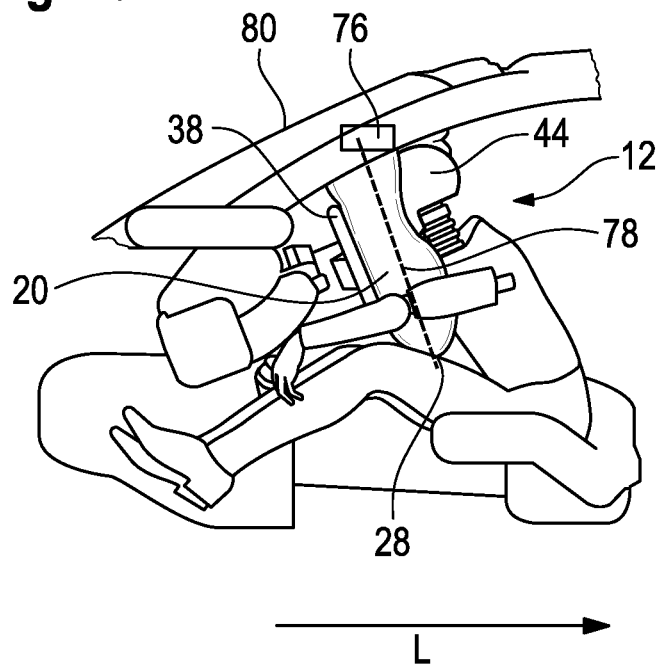
FIGS. 26 and 27 show an airbag retraction mechanism of the vehicle occupant restraint system according to the invention.
Figure 27:
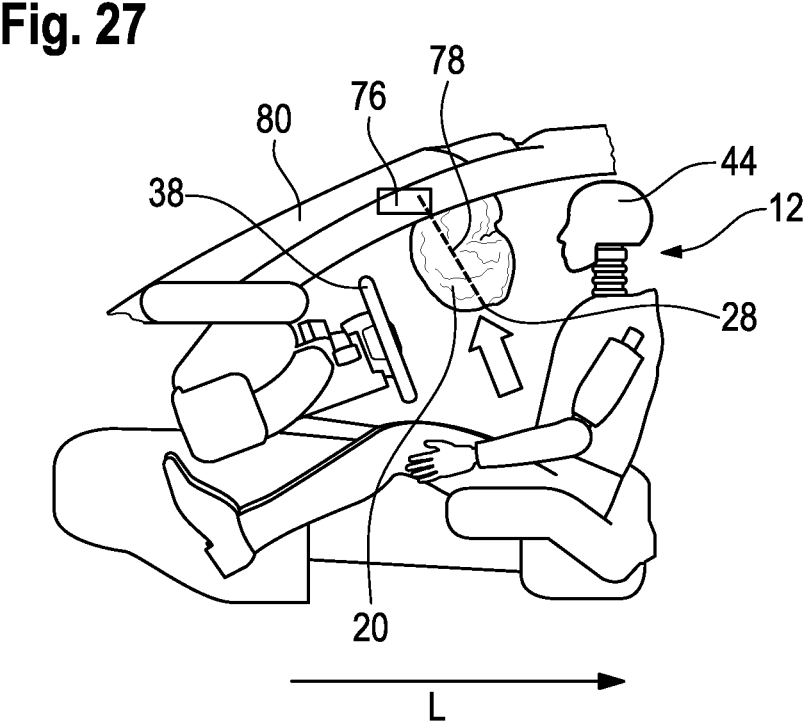

In FIGS. 26 and 27, an optional airbag retraction mechanism 76 is illustrated which is configured to retract the lower end 28 of the airbag 20 upward in the direction of the roof area 16 and away from the field of view of the vehicle occupant 12, after the airbag 20 has fulfilled its protecting function.

During and after immersion of the vehicle occupant 12 into the body 22 of the airbag 20 (see FIG. 26), the filling gas escapes from the airbag 20 through vents (not shown) so that the airbag 20 becomes compressible again.

A retracting tether 78 acting on the lower end 28 of the airbag 20 is connected to the airbag retraction mechanism 76 disposed in the roof area 16 so that, when the length of the retracting tether 78 is reduced inside the airbag, the lower end 28 of the airbag 20 is lifted upward in the direction of the roof area 16. In this way, the airbag 20 is withdrawn from the area of view of the vehicle occupant 12.

The retracting tether 78 can extend inside the airbag 20 or along the outer side of the airbag 20, e.g., along the rear side 26.

It is also possible to connect or combine the retracting tether 78 with one or more of the shaping tethers 48, 50 acting on the baffle 24 inside the airbag 20. For example, the Y-shaped tether 48, 50 shown in FIG. 22 could be connected with the retracting tether 78.

The airbag retraction mechanism 76 may be integrated in the airbag module 18, for example. A suitable pyrotechnical or mechanical drive (not shown) is used to withdraw and, e.g., gather or furl the retracting tether 78.

The airbag retraction mechanism 76 is actuated as soon as the actual situation of restraint is terminated so that the vehicle occupant 12 regains visibility through the windscreen 80 of the vehicle as soon as possible.

Figure 28:
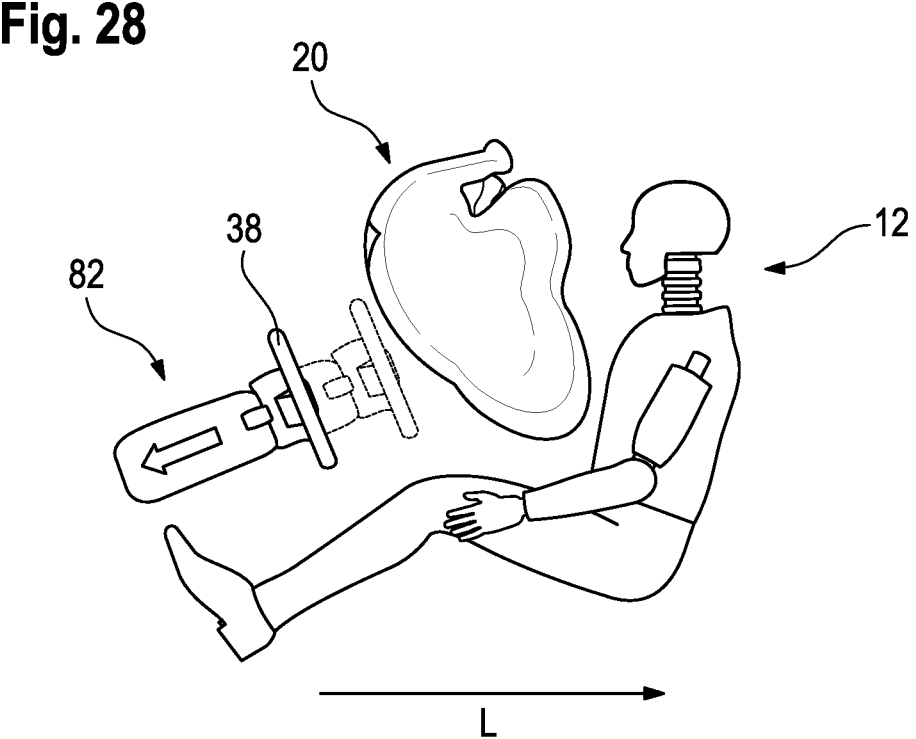
FIGS. 28 and 29 show a steering wheel positioning mechanism of the vehicle occupant restraint system according to the invention.
Figure 29:
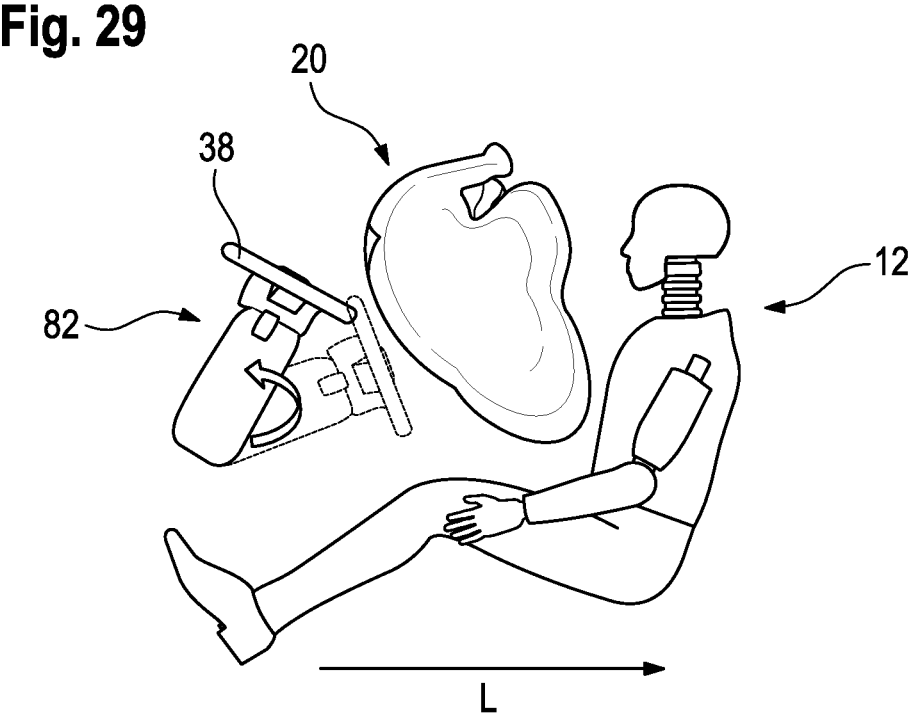

In FIGS. 28 and 29, an optimum steering wheel positioning mechanism 82 is illustrated that is configured to move the steering wheel 38 away from the vehicle occupant 12 before or during a situation of restraint. This helps increase the space for the vehicle occupant 12, especially for his/her legs.

FIG. 28 illustrates a solution in which the steering wheel 38 is displaced linearly along the direction of a steering column toward the vehicle front end.

FIG. 29 illustrates a solution in which the steering wheel 38 is pivoted upward or downward about an angle of approx. 30° to 90°.

In both cases, the drive may be pyrotechnical or mechanical, for example.

If such steering wheel positioning mechanism 82 is provided, no steering wheel airbag 40 is disposed inside the steering wheel 38, and the airbag 20 is used as the sole frontal airbag.

In FIGS. 30 to 32, the structure of the airbag module 18 is shown in greater detail.

A module housing 84 is tightly fixed to a roof crossmember 88 via mounting tabs 86 and corresponding screws. In the module housing 84, which is made, for example, from sheet steel or any other suitable rigid material, the inflator 34 as well as the airbag 20 folded into a package 89 are accommodated. The inflator 34 protrudes into the airbag 34 with a gas outlet area 90.

Via the module housing 84, the inflator 34 and the airbag 20 are also fixed tightly and permanently to the roof area 16.

A lining such as a roof liner 92 covers the airbag module 18 from the interior of the vehicle.

The airbag module 18 is disposed in the area of a sun visor 94 so that the airbag 20 deploys between the windscreen 80 and the sun visor 94.

The inflator 34 is disposed in parallel to the vehicle transverse direction Q.

In FIGS. 33 to 35, an option for connecting the inflator 34 to the airbag 20 is illustrated. The end of the neck 32 that does not lead into the body 22 of the airbag ends in an opening 96 adapted to the diameter of the inflator 34 into which the gas outlet area 90 of the inflator 34 is inserted (see FIG. 34). Here, a rim of the opening 96 is turned over to the outside so that a defined insertion opening is resulting.

After inserting the inflator 34, the same is fixed to the airbag 20 via one or more suitable clamps 98 which are slipped over the inflator 34 and the rim of the opening 96.

The gas outlet area 90 is arranged, in this way, centrally in the neck 32 so that upon activation of the inflator 34 the filling gas flows directly through the neck 32 into the body 22 of the airbag 20.

The invention claimed is:

1. A vehicle occupant restraint system comprising an airbag module that is disposed in a roof area of a vehicle and is assigned to a front seat, the airbag module comprising an airbag that is arranged so that it deploys in a vehicle longitudinal direction in front of a vehicle occupant seated in the front seat, wherein the airbag comprises first, second, and third cut parts interconnected to define an airbag body;
wherein the first, second, and third cut parts are arranged along a longitudinal axis, the second cut part being adjacent the first cut part, the third cut part being adjacent the second cut part, and the second cut part being positioned between the first cut part and the third cut part, each of the first, second, and third cut parts having a peripheral edge;
wherein the second and third cut parts comprising peripheral edges on opposite lateral sides of the longitudinal axis, adjacent peripheral edge portions of the second and third cut parts on each side of the longitudinal axis being interconnected to define a baffle that in a filled state is aligned transversely to the vehicle longitudinal direction and faces the vehicle occupant;
wherein the interconnection of the adjacent peripheral edge portions of the second and third cut parts leaving unconnected portions of the peripheral edges of the second and third cut parts that are connected to peripheral edge portions of the first cut part to close a volume of the airbag body.

2. The vehicle occupant restraint system according to claim 1, wherein the first cut part extends from a lower end of the airbag to the upper end of the airbag body.

3. The vehicle occupant restraint system according to claim 1, wherein adjacent peripheral edges of the second and third cut parts are equal in length and have different contours.

4. The vehicle occupant restraint system according to claim 1, wherein the unconnected portions of the peripheral edges of the second and third cut parts and the peripheral edge portions of the first cut part are equal in length and have different contours.

5. The vehicle occupant restraint system according to claim 1, wherein the first, second, and third cut parts are mirror-symmetrical with respect to the longitudinal axis.

6. The vehicle occupant restraint system according to claim 1, wherein the first, second, and third cut parts are portions of a singular panel of material.

7. The vehicle occupant restraint system according to claim 1, wherein at least two of the first, second, and third cut parts are separate panels of material.

8. The vehicle occupant restraint system according to claim 1, wherein the adjacent peripheral edge portions of the second and third cut parts are adjoined along a vehicle transverse direction.

9. The vehicle occupant restraint system according to claim 1, wherein inside the airbag body at least one tether is arranged which acts on the baffle of the airbag and restricts an expansion of the airbag when filled along the vehicle longitudinal direction.

10. The vehicle occupant restraint system according to claim 1, wherein an airbag retraction mechanism is provided which is configured to move the airbag away from a visual range of the vehicle occupant after filling.

11. The vehicle occupant restraint system according to claim 1, wherein the airbag module comprises the airbag in a folded condition as well as an inflator, wherein the inflator is a tubular inflator that is arranged in parallel to a vehicle transverse direction in the area of a sun visor mounted on the roof area.

12. The vehicle occupant restraint system according to claim 1, wherein the vehicle includes two front seats juxtaposed along the vehicle transverse direction, the vehicle occupant restraint system comprising a first airbag module according to claim 1 disposed in the roof area for a first of the two front seats, and a second airbag module according to claim 1 disposed in the roof area for a second of the two front seats.

13. The vehicle occupant restraint system according to claim 1, wherein the vehicle includes a steering wheel, wherein the steering wheel does not have its own steering wheel airbag, in predetermined driving situations the steering wheel is in a position where the steering wheel cannot be operated by the vehicle occupant, and/or a sensor system is provided to detect whether the vehicle occupant is touching the steering wheel.

14. The vehicle occupant restraint system according to claim 1, wherein a steering wheel positioning mechanism is provided that is configured to move a steering wheel away from the vehicle occupant in the front seat in a situation of restraint or in a pre-crash situation.

15. A method for operating a vehicle occupant restraint system according to claim 1, wherein a steering wheel is assigned to the front seat, comprising the step of deciding, in a situation of restraint, whether the airbag is filled depending on whether the vehicle occupant is touching the steering wheel, wherein a steering wheel airbag is exclusively filled when a contact with the steering wheel is detected.

* * * * *